3 Sheets—Sheet 2.

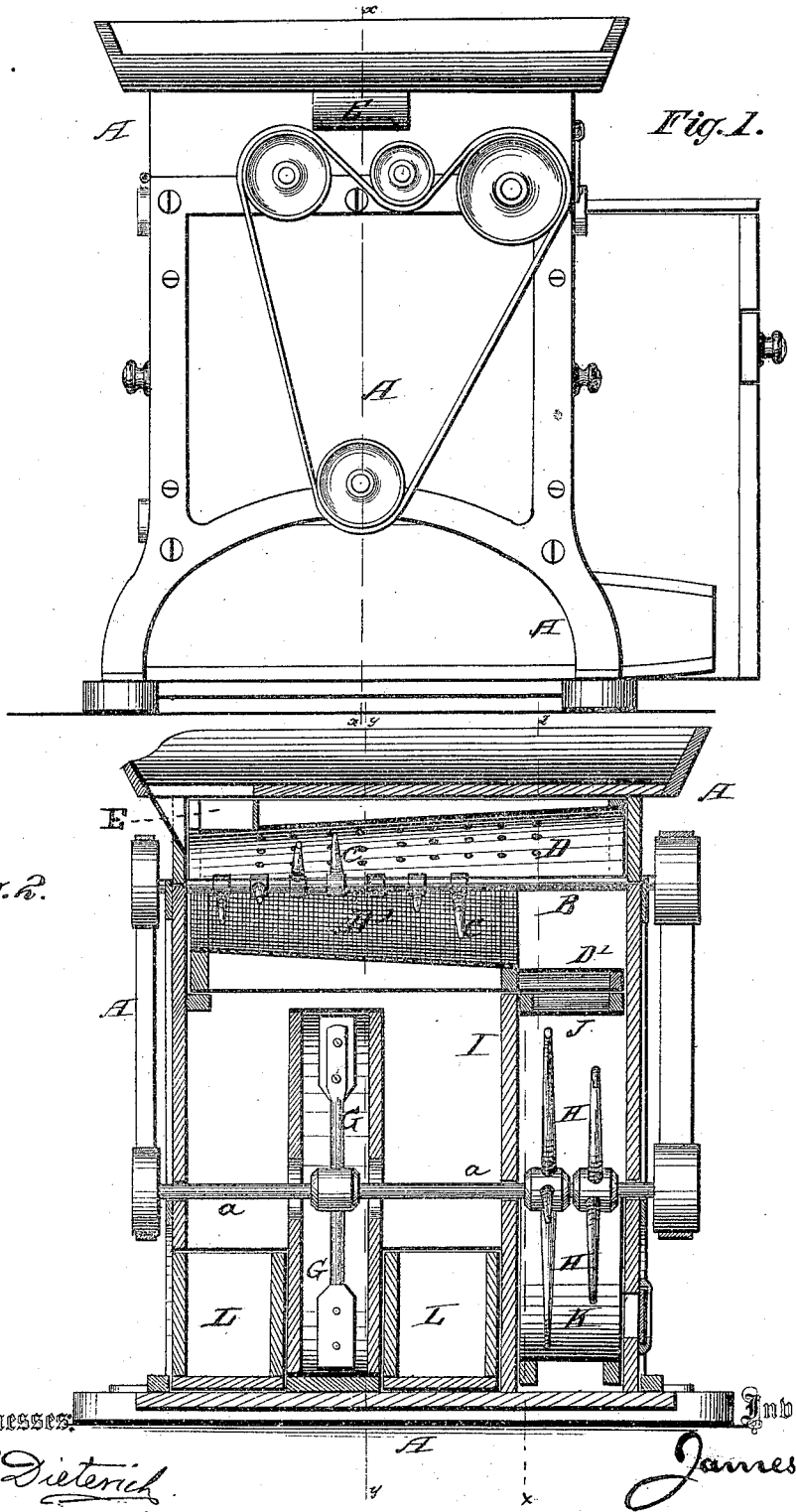

J. WRIGHT.
MOTE-EXTRACTOR, SEPARATOR AND CLEANER.

No. 172,681. Patented Jan. 25, 1876.

Witnesses:
P. C. Dieterich.
W. C. McArthur.

Inventor:
James Wright
Per: C. H. Watson & Co. Attorneys.

N. PETERS, PHOTO-LITHOGRAPHER, WASHINGTON, D. C.

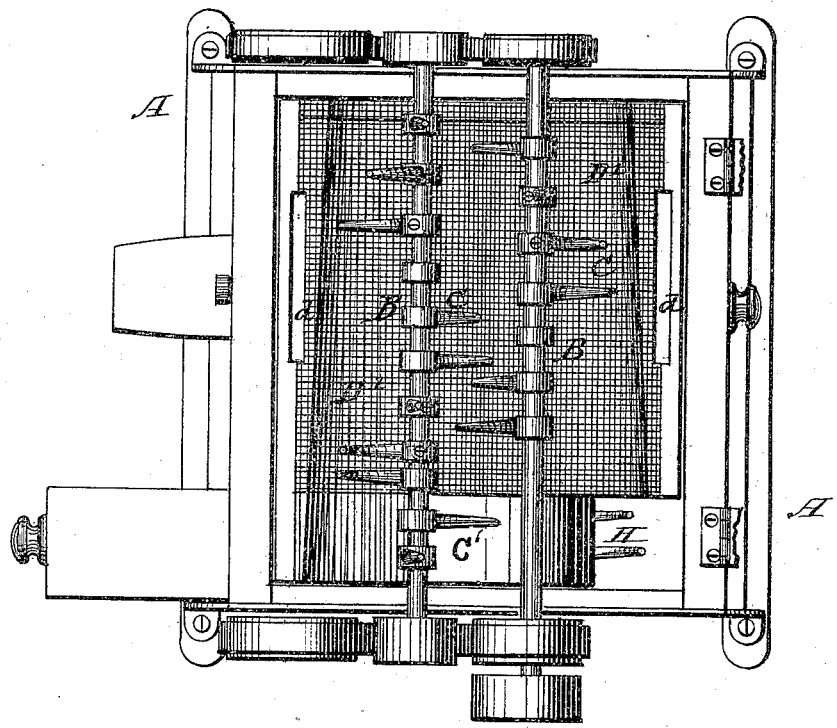

UNITED STATES PATENT OFFICE.

JAMES WRIGHT, OF BARTON, ALABAMA, ASSIGNOR OF ONE-HALF HIS RIGHT TO J. C. SMITH, JR., OF JACKSON, TENNESSEE.

IMPROVEMENT IN MOTE-EXTRACTORS, SEPARATORS, AND CLEANERS.

Specification forming part of Letters Patent No. 172,681, dated January 25, 1876; application filed November 23, 1875.

*To all whom it may concern:*

Be it known that I, JAMES WRIGHT, of Barton, in the county of Colbert and State of Alabama, have invented certain new and useful Improvements in Mote-Extractor, Separator, and Cleanser; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a mote-extractor, separator, and cleanser for seed-cotton, as will be hereinafter more fully set forth.

Figure 3:
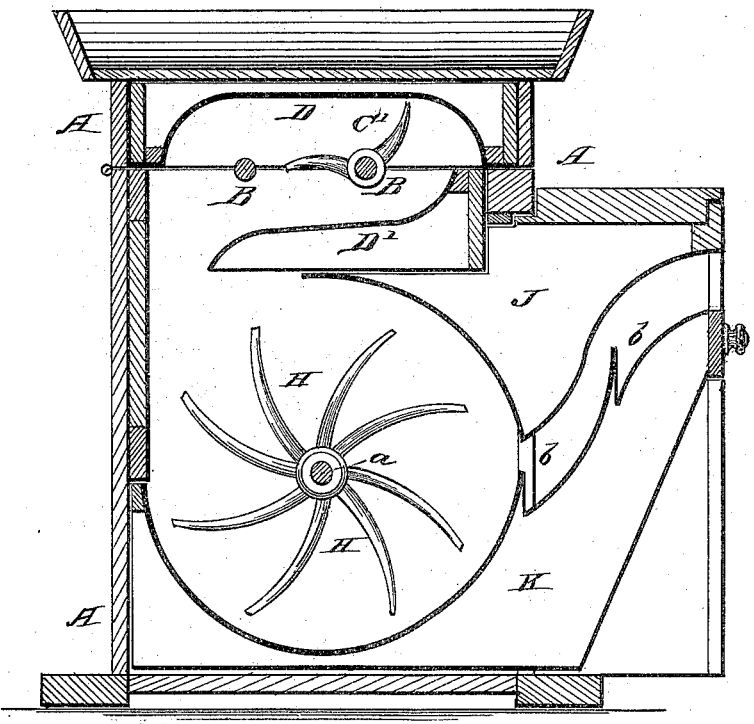
Figure 4:
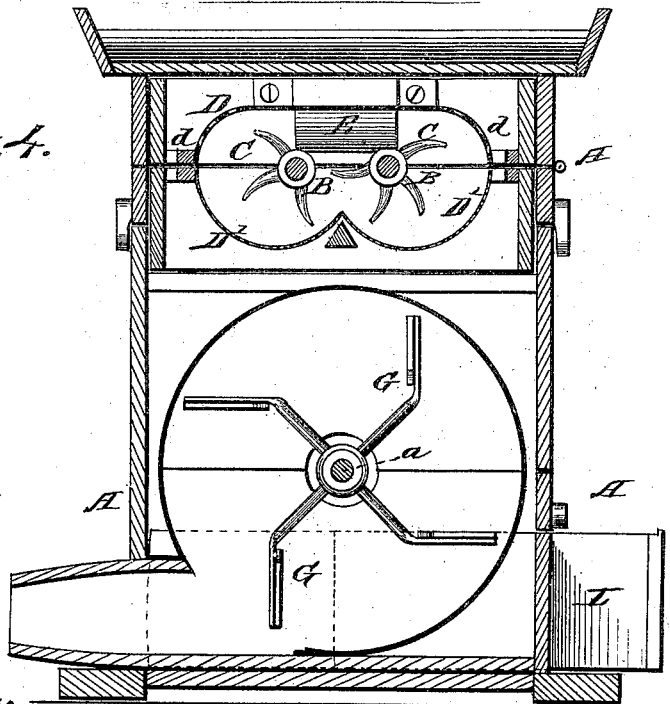

In the annexed drawings, Figure 1 is a side elevation. Fig. 2 is a vertical section through line $x\ x$. Fig. 3 is a section through line $y\ y$, Fig. 2. Fig. 4 is a section through line $z\ z$, Fig. 2. Fig. 5 is a plan view with top removed.

A represents a suitable frame-work, having its upper part hinged to the body of the frame, so as to be readily thrown open when desired.

In the division of the frame are formed suitable bearings for two cylinders or shafts, B B, provided with curved teeth or beaters C C. These teeth or beaters are provided with collars or hubs at their inner ends to slip over the shafts or cylinders B, to which they are fastened by set-screws, and said teeth or beaters are arranged upon their respective shafts or cylinders in screw form, one being a right-hand and the other a left-hand screw.

The shafts B are rotated by suitable belts or gearing, arranged in such a manner that the shafts will revolve in opposite directions, and one faster than the other. By this movement the slow cylinder partially holds the cotton, while the fast one passes it on the curve, and produces a stripping motion, like the motion of a circular shear, and the cotton is handled twice as often as if both shafts ran in the same direction.

If both shafts run in the same direction and the screws were alike, the cotton would be more or less twisted or strung; but by reversing them, while one twists the other will untwist, and the cotton is also driven out in much less time.

The cylinders thus constructed are inclosed within a conical apartment formed of a sheet-iron cover, D, partially perforated, and a wire screen-bottom, D'. The feed-opening E is at the small end of the cone, where the beaters or teeth C are made shorter, and where the heaviest part of the work is done. As the cotton is loosened and expands, it is driven down the cone, where the space becomes larger, and can be passed out freely. In the bottom of the frame, below the conical chamber D D', is the dust-fan G, which is supplied with air directly through the feed-opening E, and thence through the cotton as it is being agitated by the action of the teeth or beaters.

The frame should be constructed in such a manner as to prevent the admission of air at any other point except through the feed-opening.

$a$ is the fan-shaft, extended through the sides of the frame. On this shaft, near one side of the frame, are secured curved beaters H, for delivering the cotton. These delivery-beaters are separated or divided from the dust-fan by means of a vertical partition, I, by which arrangement all communication is shut off between the dust-fan and the discharge-pipe and separator. Outside of the screen D', on one of the shafts or cylinders B, are secured double beaters C', for the purpose of driving the cotton down the chute J, where it comes in contact with the delivery-beaters H, above mentioned, by which means the cotton is handled and cleaned in the upper compartment or story, and passed down to another set of beaters to be delivered out free from dust. The cotton is thrown out through a discharge-pipe, K, which forms a separator with a curved inclined plane, provided with offsets or chutes $b\ b$. These offsets or chutes are for the purpose of catching and retaining all metallic or heavy substances, and prevent it from going out with the cotton. On each side of the dust-fan is a drawer, L, for catching all gravel and sand that would be liable to choke the dust-pipe.

In operation, as the cotton and dust are driven against the sheet-iron top D, the dust is forced through the holes in the same, and passes down through flues $d\ d$, which connect with the chamber in which the dust-fan is placed.

Having thus fully described my invention, what I claim as new, and desire to secure by Letters Patent, is—

1. In a cotton-cleaning machine, the combination of the two shafts or cylinders B B, provided with curved teeth or beaters C C, set in screw form in opposite directions, with operating mechanism, whereby said shafts or cylinders are capable of being rotated in opposite directions at unequal speed, substantially as and for the purpose specified.

2. In a cotton-cleaning machine, the double beaters C′, in combination with the delivery-beaters H and operative mechanism, whereby the cotton is driven down and delivered, substantially as described.

3. In a cotton-cleaning machine, the cylinders B B, having curved beaters C C, in combination with the double beaters C′ and delivery-beaters H, and operative mechanism, substantially as and for the purpose set forth.

In testimony that I claim the foregoing as my own I affix my signature in presence of two witnesses.

JAMES WRIGHT.

Witnesses:
JAMES RUTLAND,
WM. RAMSEY.